US012062921B2

(12) United States Patent
Calvin et al.

(10) Patent No.: US 12,062,921 B2
(45) Date of Patent: *Aug. 13, 2024

(54) SMART POWER SYSTEM (71) Applicant: Analog Devices, Inc., Wilmington, MA (US)

(72) Inventors: James G. Calvin, Attleboro, MA (US); Michael Koran, Norton, MA (US); Albert Rooyakkers, Sunnyvale, CA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,537

(22) Filed: Mar. 14, 2023

(65) Prior Publication Data
US 2023/0283084 A1 Sep. 7, 2023

Related U.S. Application Data (60) Continuation of application No. 17/196,224, filed on Mar. 9, 2021, now Pat. No. 11,605,953, which is a
(Continued)

(51) Int. Cl.
*G05B 15/02* (2006.01)
*G05B 19/05* (2006.01)
(Continued)

(52) U.S. Cl.
CPC ............... *H02J 4/00* (2013.01); *G05B 15/02* (2013.01); *G05B 19/058* (2013.01); *G05B 19/08* (2013.01);
(Continued)

(58) Field of Classification Search
CPC ...... H02J 3/14; H02J 1/14; G06F 1/26; G06F 1/266; G06F 2200/261; G06F 1/263;
(Continued)

(56) References Cited

U.S. PATENT DOCUMENTS

| | | |
|---|---|---|
| 4,737,657 A | 4/1988 | Jatko et al. |
| 4,803,613 A | 2/1989 | Kametani et al. |
| | (Continued) | |

FOREIGN PATENT DOCUMENTS

| | | |
|---|---|---|
| CN | 201054140 Y | 4/2008 |
| CN | 102237680 A | 11/2011 |
| | (Continued) | |

OTHER PUBLICATIONS

Baran, M. et al., "Overcurrent Protection on Voltage-Source-Converter-Based Multiterminal DC Distribution Systems," IEEE Transactions on Power Delivery, vol. 22, No. 1, Jan. 2007, pp. 406-412.
(Continued)

*Primary Examiner* — Darrin D Dunn
(74) *Attorney, Agent, or Firm* — Kevin E. West; Advent, LLP (57) ABSTRACT

A smart power system is described. In one or more implementations, the smart power system comprises a microcontroller and a power converter electrically connected to the microcontroller and is configured to convert electrical energy from one form to another. The system also includes a switch element electrically connected to the microcontroller and configured to control distribution of the converted electrical energy to an electrical load. A sense element is electrically connected to the electrical load and to the microcontroller and is configured to monitor the converted electrical energy distributed to the electrical load and to furnish a feedback signal based upon the converted electrical energy. The microcontroller is configured to verify and to monitor the power converter, as well as to control and to monitor distribution of the converted electrical energy to the electrical load based upon the feedback signal.

20 Claims, 4 Drawing Sheets

Related U.S. Application Data continuation of application No. 16/019,024, filed on Jun. 26, 2018, now Pat. No. 10,944,289, which is a division of application No. 14/381,140, filed as application No. PCT/US2013/053718 on Aug. 6, 2013, now abandoned.

(51) Int. Cl.
| | |
|---|---|
| G05B 19/08 | (2006.01) |
| H02J 3/00 | (2006.01) |
| H02J 4/00 | (2006.01) |
| H02J 13/00 | (2006.01) |
| H02M 1/00 | (2007.01) |

(52) U.S. Cl.
CPC ............... *H02J 3/00* (2013.01); *H02J 13/00* (2013.01); *H02J 13/00002* (2020.01); *H02J 13/00004* (2020.01); *H02J 13/00036* (2020.01); *H02M 1/008* (2021.05)

(58) Field of Classification Search
CPC .... G06F 1/28; Y10T 307/461; Y10T 307/305; Y10T 307/391; Y02B 70/3225
See application file for complete search history.

(56) References Cited

U.S. PATENT DOCUMENTS

| | | | |
|---|---|---|---|
| 5,563,455 | A | 10/1996 | Cheng |
| 5,675,480 | A | 10/1997 | Stanford |
| 5,712,779 | A | 1/1998 | Sheppard et al. |
| 5,721,458 | A | 2/1998 | Kearney et al. |
| 5,754,445 | A | 5/1998 | Jouper et al. |
| 5,870,685 | A | 2/1999 | Flynn |
| 5,952,733 | A | 9/1999 | Johnston |
| 6,046,513 | A | 4/2000 | Jouper et al. |
| 6,104,967 | A | 8/2000 | Hagen et al. |
| 6,448,672 | B1 | 9/2002 | Voegeli et al. |
| 6,631,309 | B2 | 10/2003 | Boies et al. |
| 6,651,178 | B1 | 11/2003 | Voegeli et al. |
| 6,816,078 | B2 | 11/2004 | Onoda et al. |
| 7,281,142 | B2 | 10/2007 | Jones et al. |
| 7,392,410 | B2 | 6/2008 | Allen et al. |
| 7,657,763 | B2 | 2/2010 | Nelson et al. |
| 7,812,479 | B1 | 10/2010 | Menas |
| 7,830,044 | B2 | 11/2010 | Tai et al. |
| 7,898,826 | B2 | 3/2011 | Matthews |
| 7,983,795 | B2 | 7/2011 | Josephson et al. |
| 8,115,335 | B2 | 2/2012 | Menas et al. |
| 8,225,111 | B2 | 7/2012 | Bailey et al. |
| 8,301,404 | B2 | 10/2012 | Wright et al. |
| 8,364,961 | B2 | 1/2013 | Tanaka et al. |
| 8,390,441 | B2 | 3/2013 | Covaro et al. |
| 8,575,917 | B2 | 11/2013 | Sims et al. |
| 8,605,091 | B2 | 12/2013 | Bradbury et al. |
| 8,638,005 | B2 | 1/2014 | Biester et al. |
| 8,682,495 | B2 | 3/2014 | Carralero et al. |
| 8,742,624 | B1 | 6/2014 | Sagarwala et al. |
| 8,830,073 | B2 | 9/2014 | Sims et al. |
| 8,890,475 | B1 | 11/2014 | Becker |
| 9,130,400 | B2 | 9/2015 | Terlizzi et al. |
| 9,172,245 | B1 | 10/2015 | Lentine et al. |
| 9,337,663 | B2 | 5/2016 | Alberth et al. |
| 9,535,472 | B1 | 1/2017 | Maroney |
| 9,735,571 | B2 | 8/2017 | Sagarwala et al. |
| 2002/0118001 | A1 | 8/2002 | Duffy et al. |
| 2002/0144163 | A1 | 10/2002 | Goodfellow et al. |
| 2003/0036806 | A1 | 2/2003 | Schienbein et al. |
| 2003/0112647 | A1 | 6/2003 | Liu et al. |
| 2004/0021371 | A1 | 2/2004 | Jouper |
| 2005/0127758 | A1 | 6/2005 | Atkinson et al. |
| 2006/0036860 | A1 | 2/2006 | Avramopoulos et al. |
| 2006/0050464 | A1 | 3/2006 | Von et al. |
| 2006/0082222 | A1 | 4/2006 | Pincu et al. |
| 2006/0101296 | A1 | 5/2006 | Mares et al. |
| 2006/0120008 | A1 | 6/2006 | Kreiner |
| 2006/0242435 | A1 | 10/2006 | Swope |
| 2007/0085420 | A1 | 4/2007 | Hartung et al. |
| 2007/0089163 | A1 | 4/2007 | Denton |
| 2007/0149013 | A1 | 6/2007 | Eastham et al. |
| 2007/0224981 | A1 | 9/2007 | Youn |
| 2007/0276548 | A1 | 11/2007 | Uzunovic et al. |
| 2007/0291430 | A1 | 12/2007 | Spitaels et al. |
| 2007/0300089 | A1 | 12/2007 | Bhogal et al. |
| 2008/0089519 | A1 | 4/2008 | Ekberg |
| 2008/0183712 | A1 | 7/2008 | Westerinen et al. |
| 2009/0009005 | A1 | 1/2009 | Luo et al. |
| 2009/0064186 | A1 | 3/2009 | Lin |
| 2009/0079435 | A1 | 3/2009 | Nakata et al. |
| 2009/0088992 | A1 | 4/2009 | Matsumura et al. |
| 2009/0144568 | A1 | 6/2009 | Fung |
| 2009/0152953 | A1 | 6/2009 | Dong et al. |
| 2009/0206671 | A1 | 8/2009 | Chang |
| 2009/0273334 | A1 | 11/2009 | Holovacs et al. |
| 2009/0322160 | A1 | 12/2009 | Dubose et al. |
| 2010/0030392 | A1 | 2/2010 | Ferentz et al. |
| 2010/0042838 | A1 | 2/2010 | Ho |
| 2010/0125385 | A1 | 5/2010 | Ogawa et al. |
| 2010/0127566 | A1 | 5/2010 | Biester et al. |
| 2010/0145542 | A1 | 6/2010 | Chapel et al. |
| 2010/0177538 | A1 | 7/2010 | Scherr |
| 2010/0224008 | A1 | 9/2010 | Foss et al. |
| 2010/0225167 | A1 | 9/2010 | Stair et al. |
| 2010/0264739 | A1 | 10/2010 | Errington |
| 2010/0293241 | A1 | 11/2010 | Bishel |
| 2011/0001456 | A1 | 1/2011 | Wang |
| 2011/0010016 | A1 | 1/2011 | Giroti |
| 2011/0010770 | A1 | 1/2011 | Smith et al. |
| 2011/0055761 | A1 | 3/2011 | Williamson |
| 2011/0087904 | A1 | 4/2011 | Lee et al. |
| 2011/0157934 | A1 | 6/2011 | Clemo et al. |
| 2011/0184585 | A1 | 7/2011 | Matsuda et al. |
| 2011/0185196 | A1 | 7/2011 | Asano et al. |
| 2011/0202214 | A1 | 8/2011 | Rosendahl |
| 2011/0205761 | A1 | 8/2011 | Tschirhart et al. |
| 2011/0241443 | A1 | 10/2011 | Dubose et al. |
| 2011/0254371 | A1 | 10/2011 | Galsim et al. |
| 2012/0030391 | A1 | 2/2012 | Rodgers et al. |
| 2012/0043813 | A1 | 2/2012 | Doi et al. |
| 2012/0046015 | A1 | 2/2012 | Little |
| 2012/0056607 | A1 | 3/2012 | Lin |
| 2012/0074792 | A1 | 3/2012 | Hodges et al. |
| 2012/0091967 | A1 | 4/2012 | Kawamoto et al. |
| 2012/0102334 | A1 | 4/2012 | O'Loughlin et al. |
| 2012/0109398 | A1 | 5/2012 | Bhakta |
| 2012/0117365 | A1 | 5/2012 | Navy et al. |
| 2012/0126623 | A1 | 5/2012 | Koehl |
| 2012/0139341 | A1 | 6/2012 | Jouper |
| 2012/0249093 | A1 | 10/2012 | Grbo et al. |
| 2012/0265361 | A1 | 10/2012 | Billingsley et al. |
| 2012/0271576 | A1 | 10/2012 | Kamel et al. |
| 2013/0007456 | A1 | 1/2013 | Dean et al. |
| 2013/0007873 | A1 | 1/2013 | Prakash et al. |
| 2013/0021701 | A1 | 1/2013 | Yin et al. |
| 2013/0026825 | A1 | 1/2013 | Savage et al. |
| 2013/0074187 | A1 | 3/2013 | Kim |
| 2013/0116846 | A1 | 5/2013 | Galsim et al. |
| 2013/0243195 | A1 | 9/2013 | Kruegel et al. |
| 2013/0279224 | A1 | 10/2013 | Ofek |
| 2013/0305071 | A1 | 11/2013 | Nilsen et al. |
| 2013/0322139 | A1 | 12/2013 | Lee et al. |
| 2014/0015454 | A1 | 1/2014 | Kunimitsu et al. |
| 2014/0018990 | A1 | 1/2014 | Kataoka et al. |
| 2014/0039700 | A1 | 2/2014 | Yamashita et al. |
| 2014/0043861 | A1 | 2/2014 | Luh et al. |
| 2014/0045004 | A1 | 2/2014 | Butzmann |
| 2014/0054957 | A1 | 2/2014 | Bellis |
| 2014/0098445 | A1 | 4/2014 | Hooper |
| 2014/0136011 | A1 | 5/2014 | Jouper |
| 2014/0180486 | A1 | 6/2014 | Newman, Jr. et al. |
| 2014/0217811 | A1 | 8/2014 | Jouper et al. |
| 2014/0257572 | A1 | 9/2014 | Mohan et al. |
| 2014/0265563 | A1 | 9/2014 | Schrader |

(56) References Cited

U.S. PATENT DOCUMENTS

| | | |
|---|---|---|
| 2014/0265641 A1 | 9/2014 | Inoue |
| 2014/0281543 A1 | 9/2014 | Kato et al. |
| 2014/0316594 A1 | 10/2014 | Steele et al. |
| 2015/0052361 A1 | 2/2015 | Winkler-Teufel |
| 2015/0066227 A1 | 3/2015 | Chapel et al. |
| 2015/0130276 A1 | 5/2015 | McNeill-McCallum et al. |
| 2015/0147970 A1 | 5/2015 | Tan et al. |
| 2015/0167861 A1 | 6/2015 | Ferrer et al. |
| 2015/0173254 A1 | 6/2015 | Rodriguez et al. |
| 2015/0261231 A1 | 9/2015 | Jiang et al. |
| 2015/0293570 A1 | 10/2015 | Lo et al. |
| 2015/0301571 A1 | 10/2015 | Saulsbury et al. |
| 2015/0311894 A1 | 10/2015 | McIntosh et al. |
| 2016/0004235 A1 | 1/2016 | Luke et al. |
| 2016/0006264 A1 | 1/2016 | Alperin et al. |
| 2016/0012553 A1 | 1/2016 | Alberth, Jr. et al. |
| 2016/0043555 A1 | 2/2016 | Howell |
| 2016/0116933 A1 | 4/2016 | Craig et al. |
| 2016/0211615 A1 | 7/2016 | Dickey |
| 2016/0313744 A1 | 10/2016 | Amelio et al. |
| 2016/0336855 A1 | 11/2016 | Ozanoglu et al. |
| 2017/0005443 A1 | 1/2017 | O'Rourke |
| 2017/0133843 A1 | 5/2017 | McNeill-McCallum et al. |
| 2017/0207622 A1 | 7/2017 | Jouper et al. |
| 2017/0338736 A1 | 11/2017 | Ofek |
| 2018/0227279 A1* | 8/2018 | Kim .................. H04W 12/069 |
| 2018/0309320 A1 | 10/2018 | Calvin et al. |
| 2018/0366885 A1 | 12/2018 | Hewitt et al. |
| 2019/0052083 A1 | 2/2019 | Lucas, Jr. et al. |
| 2019/0074696 A1 | 3/2019 | Sachs et al. |
| 2019/0128771 A1 | 5/2019 | Santarone et al. |
| 2023/0037251 A1* | 2/2023 | Xu ........................ H04L 67/12 |
| 2023/0231718 A1* | 7/2023 | Sauerwald ............ H04W 12/08 726/19 |

FOREIGN PATENT DOCUMENTS

| | | |
|---|---|---|
| CN | 102891466 A | 1/2013 |
| EP | 2557670 A2 | 2/2013 |
| JP | S5974413 U | 5/1984 |
| JP | H0898274 A | 4/1996 |
| JP | H11235044 A | 8/1999 |
| JP | 2007512798 A | 5/2007 |
| JP | 2007252081 A | 9/2007 |
| JP | 4433736 B2 | 3/2010 |
| JP | 2012100414 A | 5/2012 |
| WO | 2013033247 A1 | 3/2013 |
| WO | 2013033427 A2 | 3/2013 |
| WO | 2013102069 A1 | 7/2013 |
| WO | 2013103804 A1 | 7/2013 |

OTHER PUBLICATIONS

Examination Report for European Application No. 13891327.2, dated Sep. 26, 2018.

Extended European Search Report for Application No. 22170902.5, dated Nov. 18, 2022.

Ken Dietz, Battery Authentication for Portable Power-Supply Systems, Microchip Technology, Inc., Chandler, AZ.

Mesut E. Baran et al., "Overcurrent Protection on Voltage-Source-Converter-Based Multiterminal DC Distribution Systems", IEEE Transactions on Power Delivery, IEEE Service Center, New York, NY, US, vol. 22, No. 1, Jan. 1, 2007 (Jan. 1, 2007), pp. 406-412, XP011152553, ISSN: 0885-8977, DOI: 10.1109/TPWRD.2006.877086.

Notice of Reasons for Rejection dated Jul. 13, 2017 for Japanese Application No. JP2016-533279.

Notice of Reasons for Rejection dated Mar. 1, 2018 for Japanese Application No. JP2016-533279.

Notification of the Second Office Action for Chinese Application No. 201380079514.4, dated Nov. 5, 2018.

Office Action dated Feb. 5, 2018 for Chinese Application No. CN201380079514.4.

Office Action of Chinese Application No. 201380079514.4, dated Apr. 8, 2020.

Office Action of Chinese Application No. 201380079514.4, dated Jun. 4, 2019.

Reason for Rejection in Japanese Patent Application No. 2016-533279, dated Aug. 13, 2018.

Shibata, Koji et al., "Latest Technologies for and Standardization of Industrial Controllers to Achieve Smart Communities", Toshiba Review, vol. 66, No. 10, Oct. 1, 2011, pp. 19-22.

Supplementary European Search Report for European Patent Application No. EP 13891327 Mailed on Jan. 18, 2017, 8 pages.

* cited by examiner

FIG. 4

SMART POWER SYSTEM

RELATED APPLICATIONS

This application is a continuation application of Non-Provisional U.S. patent application Ser. No. 17/196,224 (now U.S. Pat. No. 11,605,953), filed Mar. 9, 2021, and titled "SMART POWER SYSTEM," which is a continuation of U.S. Non-Provisional patent application Ser. No. 16/019,024 (now U.S. Pat. No. 10,944,289), filed Jun. 26, 2018, and titled "SMART POWER SYSTEM." U.S. patent application Ser. No. 16/019,024 is a divisional application of U.S. Non-Provisional patent application Ser. No. 14/381,140 (now abandoned), filed Aug. 26, 2014, and titled "SMART POWER SYSTEM," which was a National Stage entry under 35 U.S.C. § 371 from PCT Patent Application No. PCT/US2013/53718, filed on Aug. 6, 2013, and titled "SMART POWER SYSTEM." The aforementioned Non-Provisional Patent Applications and PCT Patent Application are all incorporated herein by reference in their entireties.

BACKGROUND

Industrial control systems (ICS), which may include process control systems (PCS), distributed control systems (DCS), programmable logic controller (PLC)-based systems, supervisory control and data acquisition (SCADA) systems, and the like are instrumental in the production of goods and provision of essential services. ICS is the label for the digital technology that collects, monitors, analyzes, decides, controls and acts to safely produce and move physical things.

Industrial Control Systems (ICS) include electrical power systems that employ various electrical components to supply, transmit, and use electric power. Typically, electrical power systems include one or more power sources that are configured to supply power to the system. The power sources may be direct current (DC) power sources that deliver DC power to the system or alternating current (AC) power sources that deliver AC power to the system. The electrical power systems deliver energy to electrical loads that perform a function. These electrical loads can range from sensors to motors.

SUMMARY

A smart power system is described. In one or more implementations, the smart power system comprises a microcontroller and a power converter electrically connected to the microcontroller that is configured to convert electrical energy from one form to another. A switch element electrically connected to the microcontroller is configured to control distribution of the converted electrical energy to an electrical load. A sense element electrically connected to the electrical load and to the microcontroller is configured to monitor the converted electrical energy distributed to the electrical load, and to furnish a feedback signal based upon the converted electrical energy. The microcontroller is configured to verify and to monitor the power converter, as well as to control and to monitor distribution of the converted electrical energy to the electrical load based upon the feedback signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the Detailed Description and the figures may indicate similar or identical items.

DETAILED DESCRIPTION

Overview

Electrical power systems employed by industrial control systems (ICS) power electrical loads to allow the loads to perform some functionality. For example, electrical loads may include input/output (I/O) modules that are configured to perform dedicated functionality within the industrial control system. These I/O modules may be subjected to overcurrent events (e.g., the I/O modules run "hot"). However, the power system may still provide current to the I/O modules when the modules are running hot, which may result in damage to or possible destruction of the I/O module. Additionally, the power system may furnish power to each slot within the industrial control system. However, some slots may not be in use (e.g., a slot within the industrial control system does not have an I/O module that interfaces with that slot).

Accordingly, a smart power system is described. The smart power system is configured to monitor one or more electrical loads that the smart power system powers. For example, the smart power system may be configured to monitor a current furnished to the electrical loads, a temperature associated with the electrical load, and so forth. In some instances, the smart power system may cease powering an electrical load when the electrical load is subjected to an overcurrent event. In one or more implementations, the smart power system comprises a microcontroller and a power converter electrically connected to the microcontroller. The power converter is configured to convert electrical energy from one form to another. For example, the power converter may convert electrical energy from alternating current (AC) electrical energy to direct current (DC) electrical energy, or vice versa. In another example, the amplitude characteristics and/or the frequency characteristics of the electrical energy may be modified. A switch element electrically connected to the microcontroller is configured to control distribution of the converted electrical energy to an electrical load.

In embodiments, the switch element comprises a plurality of switches arranged in an H bridge configuration. A sense element electrically connected to the electrical load and to the microcontroller is configured to monitor the converted electrical energy distributed to the electrical load and to furnish a feedback signal based upon a characteristic of the converted electrical energy. In a specific embodiment, the sense element comprises an impedance element.

The microcontroller is configured to verify and to monitor the power converter, as well as to control and to monitor distribution of the converted electrical energy to the electrical load based upon the feedback signal. For example, the microcontroller may be configured to generate control signals that control operation of the switch element. In an implementation, a first microcontroller control signal may cause the switch element to transition between a closed configuration and an open configuration to at least substantially prevent distribution of the converted electrical energy to the electrical load, while a second microcontroller control signal may cause the switch element to transition between the open configuration and the closed configuration to distribute the converted electrical energy to the electrical load. In another implementation, one or more microcontroller control signals (e.g., alternating square waves, etc.) may cause the switch element to modify the converted electrical energy (e.g., modify a frequency characteristic of an electrical signal representing the converted electrical energy).

Example Smart Power System

Figure 1:
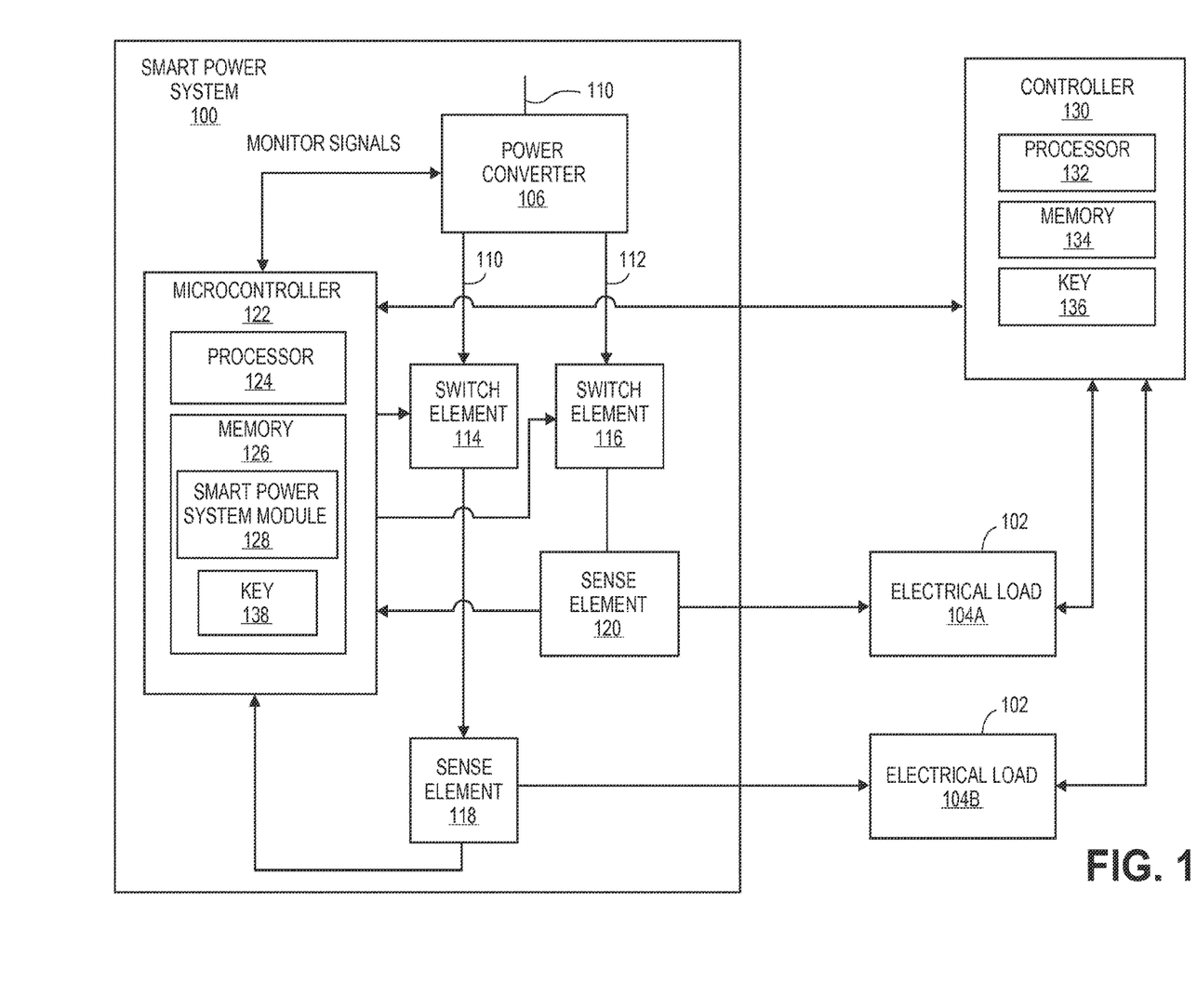
FIG. 1 is a block diagram illustrating a smart power system in accordance with example implementation of the present disclosure.

FIG. 1 illustrates an example smart power system 100 in accordance with the present disclosure that is operable to monitor and/or control power distribution to one or more electrical loads 102 (e.g., electrical loads 104A, 104B are shown for simplicity). In one or more implementations, the electrical loads 102 may comprise input/output (I/O) modules 104 of an industrial control system (ICS). For example, the input/output module 104 may comprise an input/output module utilized within a telecommunications infrastructure. In another implementation, the input/output module may comprise an input/output module utilized within an industrial and process control system infrastructure.

As shown in FIG. 1, the smart power system 100 includes a power converter 106 configured to furnish power conversion functionality to the system 100. The power converter 106 includes an input terminal 108 that receives electrical energy and one or more output terminals (e.g., output terminals 110, 112 are shown for simplicity) that furnish converted electrical energy to the system 100. The power converter 106 is configured to convert electrical energy from one form to another. For example, the power converter 106 may be configured to modify a voltage amplitude characteristic and/or a voltage frequency characteristic. In another example, the power converter 106 is configured to convert an alternating current (AC) voltage to a direct current (DC) voltage, or vice versa. In some implementations, the power converter 106 is configured to receive electrical energy ranging from about ninety volts AC (90 VAC) to two hundred and forty volts AC (240 VAC). In other implementations, the power converter is configured to receive electrical energy from a twenty-four volt DC (24 VDC) power supply. For example, the power converter 106 may receive a ninety volt AC (90 VAC) signal at the input terminal 108. In another example, the power converter 106 may receive a one hundred and twenty volt AC (120 VAC) signal at the input terminal 108. In yet another example, the power converter 106 may receive a two hundred and forty volt AC (240 VAC) signal at the input terminal 108.

The smart power system 100 also includes one or more switch elements. In FIG. 1, the illustrated smart power system 100 includes a first switch element 114 and a second switch element 116 that are configured to control operation (e.g., powering) of the electrical loads 102 (e.g., electrical load 104A and electrical load 104B). For example, the switch elements 114, 116 are configured to furnish the converted electrical energy to the electrical loads 104A, 104B to power the loads 104A, 104B. The first and the second switch elements 114, 116 are electrically connected to the output terminals 110, 112, respectively. The switch elements 114, 116 are configured to each have an open configuration to at least substantially prevent current flow and a closed configuration to allow current flow. In one or more implementations, as described in greater detail below, the switch elements 114, 116 may be configured to output a signal having a modified frequency characteristic with respect to the frequency characteristic of the signal input to the respective switch element 114, 116.

Each switch element 114, 116 is electrically connected to a sense element 118, 120 that is configured to monitor a respective load 104A, 104B. The switch elements 114, 116 are configured to provide a feedback signal based upon the current flow to a respective load 104A, 104B. For example, in the illustrated embodiment, each sense element 118, 120 is electrically connected to a respective electrical load (e.g., electrical loads 104A, 104B). The sense elements 118, 120 are configured to monitor the respective electrical loads 104A, 104B and to provide a feedback signal based upon the monitoring of the electrical load 104A, 104B. For example, the feedback signals may comprise a signal indicative of a current value that is being furnished to a respective electrical load 104A, 104B.

Figure 2A:
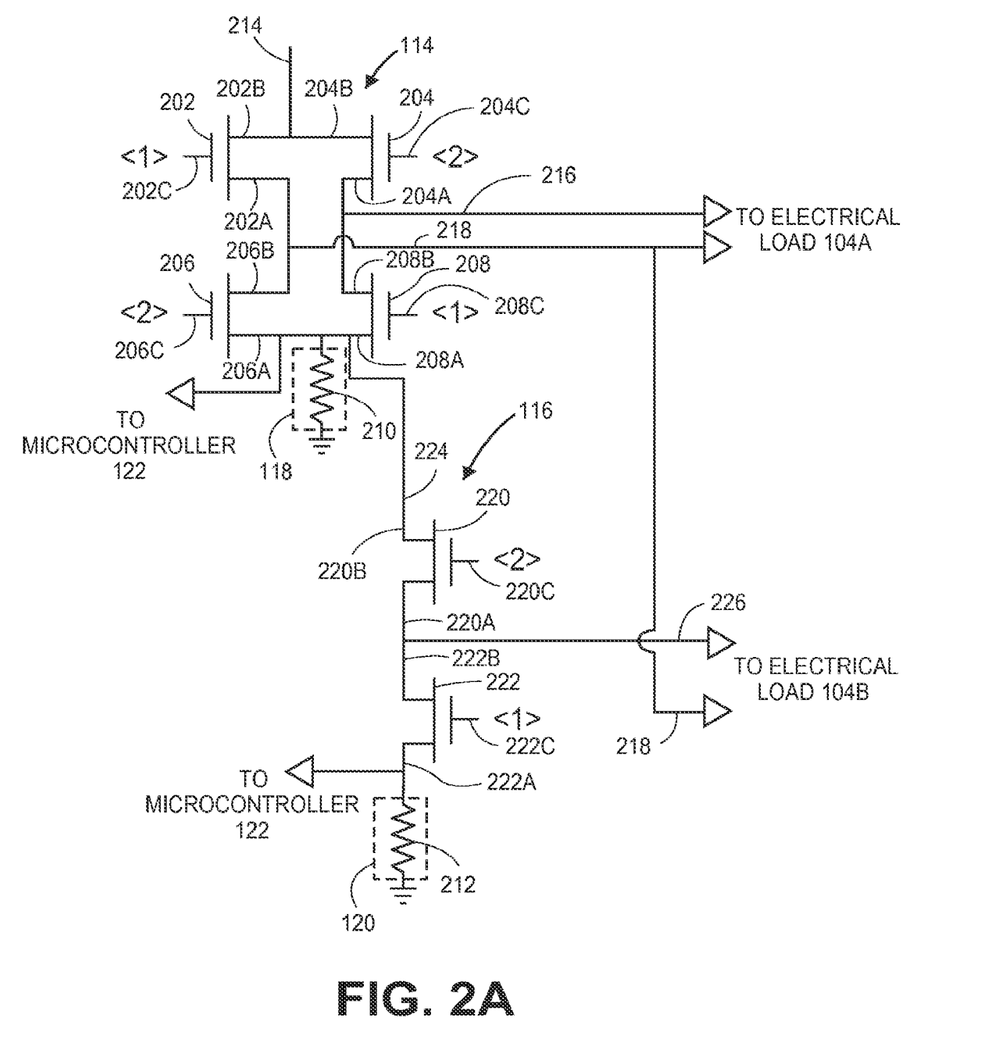
FIG. 2A is a circuit diagram illustrating a switch element of the smart power system in accordance with an example implementation of the present disclosure.

As shown in FIG. 2A, the first switch element 114 and the second switch element 116 may comprise multiple switches 202, 204, 206, 208 arranged within an H bridge configuration (e.g., an H bridge device). In one or more implementations, the switches 202, 204, 206, 208 may comprise one or more transistors such as metal-oxide-semiconductor field-effect transistors (MOSFETs), electromechanical relays, or the like. For example, in the illustrated implementation, the switches 202, 204, 206, 208 each comprise a MOSFET device that includes a drain terminal 202A, 204A, 206A, 208A, a source terminal 202B, 204B, 206B, 208B, and a gate terminal 202C, 204C, 206C, 208C. Moreover, in the following discussion, the combination of the switch 202 and the switch 206 and/or the combination of the switch 204 and 208 may each be referred to as a "common FET pair." The sense elements 118, 120 may comprise impedance elements 210, 212, respectively, as shown in FIG. 2A. For example, the impedance elements 210, 212 may comprise one or more resistors, an electrical trace having a known resistance, or one or more MOSFETs.

As shown in FIG. 2A, the first switch element 114 includes an input terminal 214 electrically connected to the drain terminals 202B, 204B of the switches 202, 204. The input terminal 214 of the first switch element 114 is configured to receive the converted electrical energy from the power converter 106, and the output terminals 216, 218 are configured to electrically connect to the load 104A. The first output terminal 216 is electrically connected between the source terminal 202A of the switch 202 and the drain terminal 206B of the switch 206, and the output terminal 218 is electrically connected between the source terminal 204A of the switch 204 and the drain terminal 208B of the switch 208. The source terminal 206A of the switch 206 and the source terminal 208A of the switch 208 are electrically connected to a microcontroller 122, the second switch element 116, and the sense element 118.

The second switch element 116 comprises switches 220, 222 arranged in series, which reduces the number of switches required for a switching element (e.g., compared with a switching element employed as an H bridge device). In one or more implementations, the switches 220, 222 may comprise one or more transistors such as metal-oxide-semiconductor field-effect transistors (MOSFETs), electromechanical relays, or the like. In a specific implementation, the switch element 116 includes an input terminal 224, which is electrically connected to the source terminals 202B, 204B of the switches 202, 204, and an output terminal 226. The input terminal 224 of the second switch element 116 is configured to receive the converted electrical energy from the first switch element 118. The output terminal 226 is configured to electrically connect to the load 104B. As shown, the output terminal 226 is electrically connected between the source terminal 220A of the switch 220 and the drain terminal 222B of the switch 222. The source terminal 222A of the switch 222 is electrically connected to a microcontroller 122 and the sense element 120. In some implementations, the system 100 may include additional electrical loads 102 in accordance with the capabilities of the system 100. In these implementations, the system 100 may employ an additional switch element (e.g., switches 220, 222 arranged in series) and corresponding sense element for each additional electrical load.

As shown in FIG. 1, the smart power system 100 includes a microcontroller 122 configured to control and to monitor power distribution to the electrical loads 102. For example, the microcontroller 120 is configured to monitor and/or control distribution of the converted electrical energy to the electrical loads 104A, 104B. The microcontroller 120 is electrically connected to the power converter 106, the switch elements 114, 116, and the sense elements 118, 120.

As shown, the microcontroller 122 includes a processor 124 and a memory 126. The processor 124 provides processing functionality for the microcontroller 122 and may include any number of processors or other processing systems, and resident or external memory for storing data and other information accessed or generated by the microcontroller 122. The processor 124 may execute one or more software programs (e.g., modules) that implement techniques described herein. The memory 126 is an example of tangible computer-readable media that provides storage functionality to store various data associated with the operation of the microcontroller 122, software functionality described herein, or other data to instruct the processor 124 and other elements of the microcontroller 122 to perform the steps described herein. Although a single memory 126 is shown within the microcontroller 122, a wide variety of types and combinations of memory may be employed. The memory 126 may be integral with the processor 124, standalone memory, or a combination of both. The memory may include, for example, removable and non-removable memory elements such as RAM, ROM, Flash (e.g., SD Card, mini-SD card, micro-SD Card), magnetic, optical, USB memory devices, and so forth.

As shown in FIG. 1, the microcontroller 122 includes a smart power system module 128, which is storable in the memory 126 and executable by the processor 124. For example, the smart power system module 128 may comprise computer-readable instructions configured to be executed by the processor 124 to define and to drive one or more system 100 controls. In an implementation, the smart power system module 128 represents functionality to control operation of the switch elements 114, 116 based upon one or more input parameters. The input parameters may include, but are not limited to: feedback signals furnished by the sense elements 118, 120, monitoring signals indicative of power conversion parameters associated with the power converter 106 and signals received from an external controller.

As described in greater detail herein, the smart power system module 128 is configured to cause the processor 124 to compare the input parameters with one or more programmable thresholds to control operation of one or more aspects of the system 100. In some implementations, the smart power system module 128 may be upgradable (e.g., one or more computer-readable instructions are replaced in accordance with the requirements of the upgrade). For example, one or more programmable thresholds may be upgraded based upon the electrical loads 102 interfacing with the system 100 (e.g., upgrade the computer-readable instructions based upon different power characteristics associated with an electrical load 102 that interfaces with the system 100).

In some implementations, the smart power system module 128 is configured to cause the processor 124 to store historical data relating to the electrical loads 102 within the memory 126. For example, the smart power system module 128 may cause the processor 124 to store data relating to temperatures associated with the electrical loads 102 (e.g., temperature at discrete time intervals), store data relating to current delivered to the electrical loads 102 (e.g., current values delivered to the electrical loads at discrete time intervals), and so forth. The smart power system module 128 may be configured to cause the processor 124 to furnish historical trend data relating to a particular electrical load 102 (e.g., historical trend data associated with the electrical load 102A, historical trend data associated with the electrical load 102B, etc.). In some instances, the smart power system module 128 may utilize the historical trend data to alert a user associated with the smart power system 100 that a particular load 102 is failing (or that failure of the load 102 is imminent).

The microcontroller 122 may be operatively connected to switch elements 114, 116. For example, as shown in FIG. 2A, the microcontroller 122 is operatively connected to the gate terminals 202C, 204C, 206C, 208C, 220C, 222C. During operation of the smart power system 100, the microcontroller 122 is configured to selectively issue control signals (e.g., operational signals) to the gate terminals 202C, 204C, 206C, 208C, 220C, 222C to control operation of the respective switch elements 114, 116. The terminals 202C, 208C of the switch element 114 and terminal 222C of the switch element 116 are configured to receive a first microcontroller control signal; and the terminals 204C, 206C of the switch element 114 and the terminal 220C of the switch element 116 is configured to receive a second microcontroller control signal.

Figure 2B:
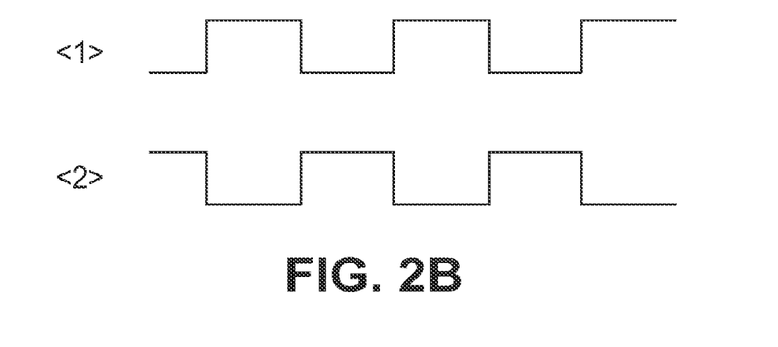
FIG. 2B is a waveform diagram illustrating example microcontroller control signals (e.g., microcontroller control signal <1> and microcontroller signal <2>) for operating the switch element shown in FIG. 2A in accordance with an example implementation of the present disclosure.

In embodiments, the first microcontroller control signal may comprise a signal having square wave characteristics, and the second microcontroller control signal may comprise a signal having square wave characteristics that is approximately one hundred and eighty degrees (180°) out of phase with respect to the first microcontroller control signal (see FIG. 2B). For example, during a first discrete time interval, the control signals may cause the switches 202, 208, 220 to be in a closed configuration to allow current flow and may cause the switches 204, 206, 222 to be in the open configuration to at least substantially prevent current flow. During a second discrete time interval, the control signals may cause the switches 204, 206, 220 to be in a closed configuration to allow current flow and may cause the switches 202, 208, 222 to be in the open configuration to at least substantially prevent current flow. Utilizing control signals that are at least approximately one hundred and eighty degrees (180°) out of phase with respect to one another may allow the switch elements 114, 116 to generate a higher frequency converted energy signal (e.g., a converted signal having higher frequency characteristics with respect to the frequency characteristics of the converted signal at the input terminal 214 of the switch element 114) at the output terminals 216, 218, which are utilized to at least partially power the loads 104A, 104B.

The microcontroller control signals illustrated in FIG. 2B are utilized to control the switch elements 114, 116 when the switch elements 114, 116 are in the closed configuration to distribute the converted electrical energy to the load 102. The microcontroller 122 is also configured to issue microcontroller control signals for causing the switch elements 114, 116 to transition between the closed configuration to allow distribution of the converted electrical energy and the open configuration to prevent distribution of the converted electrical energy.

The smart power system module 128 may be configured to operate the switch elements 114, 116 based upon the feedback signals received from the sense elements 118, 120. As described above, the feedback signals are representative of the current flow through a respective switch element 114, 116 and/or a respective switch element 118, 120. In an implementation, the smart power system module 128 is configured to cause the processor 124 to compare the feedback signals with a programmable current threshold. The smart power system module 128 is further configured to instruct the processor 124 to cause generation of a microcontroller signal to cause a switching element 114, 116 to transition from the closed configuration to the open configuration, which may prevent an electrical load 102 from being damaged or destroyed due to an overcurrent event. The programmable current threshold may be defined based upon the electrical load 102 interfaced with the system 100. For example, a first programmable current threshold may be defined for the first electrical load 104A, and a second programmable current threshold (e.g., a lower current threshold, a higher current threshold, the same current threshold) may be defined for the second electrical load 104B. In another implementation, the smart power system module 128 may be configured to control operation of the switch elements 114, 116 based upon monitoring signals received from the power converter 106. For instance, the microcontroller 122 is configured to interface with the power converter 106 to continually monitor power efficiency and/or power conversion parameters associated with the power converter 106. The smart power system module 128 is also configured to cause the processor 124 to verify that the power converter 106 is operational. For example, the smart power system module 128 may be configured to cause the processor 124 to verify the power efficiency and/or power conversion parameters are operating within a set range of programmable power converter parameters.

As shown in FIG. 1, a controller 130 is configured to interface with the microcontroller 122 and the electrical loads 102. The controller 130 includes a processor 132 and a memory 134 and is configured to bi-directionally communicate with the microcontroller 122. The controller 130 may be external to the smart power system 100 and may be configured to at least partially control operation of the microcontroller 122 and/or to furnish electrical load parameters (e.g., diagnostic information) to the microcontroller 122. From the perspective of the controller 130, the microcontroller 122 may appear to be an input/output module.

In an implementation, the controller 130 and/or the microcontroller 122 may each include a respective unique security credential (e.g., a key 136 and a key 138) for identifying with one another or with other components of the system 100. These keys 136, 138 may be provided to the respective controller 130 and microcontroller 122 to form a key-pair to furnish security functionality to the system 100. The controller 130 may be configured to prevent the microcontroller 122 from operating if the controller 130 cannot identify the key 138 associated with the microcontroller 122, or vice versa. Utilizing the keys 136, 138 may prevent unauthorized use of the system 100 or prevent other manufacturer's microcontrollers (or controllers) from being utilized with the system 100.

The controller 130 is also connected with the electrical loads 102. The controller 130 is configured to receive electrical load signals representing one or more electrical load parameters from the electrical loads 102. For example, the parameters may include, but are not limited to: parameters representing a current flow through the load 102, a temperature associated with the electrical load, or the like. These parameters may represent diagnostic information received from the electrical loads 102. The controller 130 is configured to furnish a controller signal indicative of the electrical load parameters to the microcontroller 122. In an implementation, the smart power system module 128 is configured to instruct the processor 124 to compare the controller signal to a programmable electrical load parameter threshold. The electrical load parameter threshold may represent an electrical load current flow threshold, an electrical load temperature threshold, or the like. For example, the smart power system module 128 may instruct the processor 124 to compare an electrical load parameter threshold associated with the electrical load 104A to the respective programmable electrical load parameter threshold. Based upon the comparison (e.g., temperature within the electrical load 104A is too high, electrical load 104A is receiving too much current, etc.), the smart power system module 128 is configured to instruct the processor 124 to cause a switch element 114, 116 corresponding to the electrical load 104A to transition from the closed configuration to the open configuration to at least substantially prevent converted electrical energy from powering the electrical load 104A. In some implementations, the controller 130 comprises a slave device to the microcontroller 122.

Figure 3:
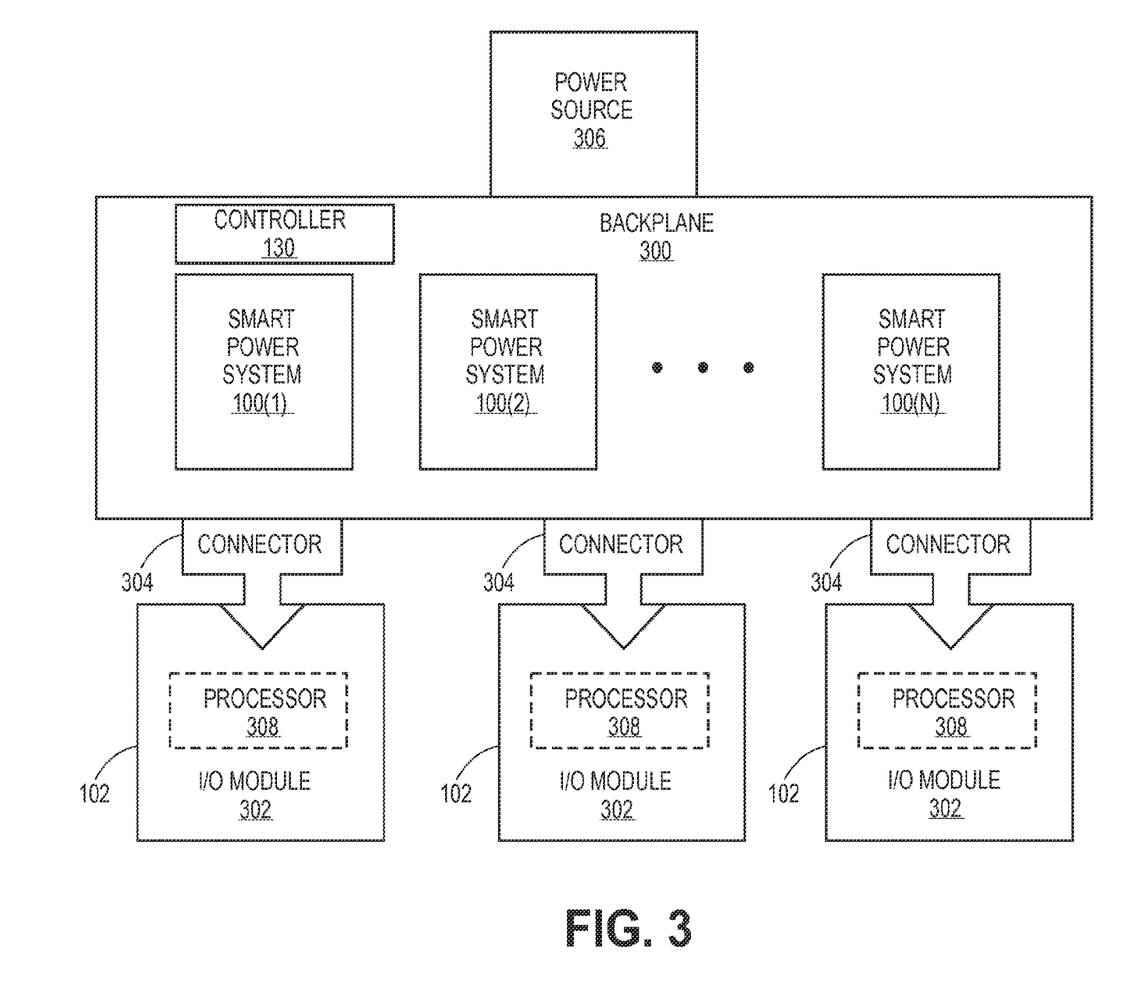
FIG. 3 is a block diagram illustrating a backplane having a smart power system integrated therein in accordance with an implementation of the present disclosure.

FIG. 3 illustrates an example system that includes a backplane 300 in accordance with an example implementation of the present disclosure where the smart power system 100 is integrated within the backplane 300. Backplanes, such as the backplane 300, are typically utilized within industrial systems or telecommunications systems for power and/or communications signal transmission. As shown, the backplane 300 includes pluggable input/output (I/O) modules 302 (e.g., an electrical load 102). For example, the backplane 300 may include connectors 304 (e.g., slots) that are configured to mate with the input/output modules 302, which interface the input/output modules 302 with the smart power system 100, and the smart power system 100 is utilized to at least partially power the input/output modules 302 as described above. For instance, the backplane 300 may utilize a power source 306, such as a DC power source or an AC power source, and the power converter 106 of the smart power system 100 is configured to convert the electrical energy from one form to another and to at least partially power the input/output modules 302 utilizing the converted electrical energy as described above.

As shown in FIG. 3, the electrical loads 102 (e.g., the input/output modules 302) may each include a processor 308 that is configured to furnish processing functionality to the respective load 102. For example, the input/output modules 302 are configured to interface with the controller 130, as described within the present disclosure. The processor 308 may be configured to furnish one or more electrical load 102 parameters to the controller 130. For example, the parameters may include diagnostic information, such as current flow associated with the load 102, temperatures associated with the load 102, and the like.

In an implementation, the input/output modules 302 may comprise input modules, output modules, and/or input and output modules utilized within an industrial control system. The input modules can be used to receive information from input instruments of an industrial control system in the process or the field, while output modules can be used to transmit instructions to output instruments in the field. For example, an I/O module 302 can be connected to a process sensor, such as a sensor for measuring pressure in piping for a gas plant, a refinery, and so forth. In implementations, the input/output modules 302 may be used to collect data and control systems in applications including, but not necessarily limited to: industrial processes, such as manufacturing, production, power generation, fabrication, and refining; infrastructure processes, such as water treatment and distribution, wastewater collection and treatment, oil and gas pipelines, electrical power transmission and distribution, wind farms, and large communication systems; facility processes for buildings, airports, ships, and space stations (e.g., to monitor and control Heating, Ventilation, and Air Conditioning (HVAC) equipment and energy consumption); large campus industrial process plants, such as oil and gas, refining, chemical, pharmaceutical, food and beverage, water and wastewater, pulp and paper, utility power, mining, metals; and/or critical infrastructures.

In another implementation, the input/output modules 302 may comprise input modules, output modules, and/or input and output modules utilized within a telecommunications network. For instance, input modules can be used to receive information from input instruments of a telecommunications network, while output modules can be used to transmit instructions to output instruments in the telecommunications network.

As shown in FIG. 3, the backplane 300 may include one or more additional smart power systems 100, which may be integrated therein. The additional smart power systems 100 are configured to furnish redundant functionality within the backplane 300 in the event one or more of the smart power systems 100 becomes non-operational. For example, each smart power system 100 (e.g., system 100(1), system 100(2), . . . 100(N)) integrated within the backplane 300 individually interface with each I/O module 302 (e.g., electrical load 102) connected to the backplane 300. In an implementation, each smart power system 100 is configured to furnish a sufficient amount of converted electrical energy to each I/O module 302 such that the input/output modules 302 are capable of being powered by only a single power system 100. In another implementation, one or more smart power systems 100 may be utilized to power the input/output modules 302. For example, a first smart power system 100 and a second smart power system 100 may be configured to at least substantially power a first I/O module 302. The controller 130 may be configured to select which system 100(1), system 100(2), . . . 100(N) furnishes the converted electrical energy to which I/O module 302 in accordance with the requirements of the backplane 300. Additionally, while only one controller 130 is illustrated, it is contemplated that multiple controllers 130 may be utilized within the backplane 300 to provide controller 130 redundant functionality.

In an implementation, the smart power systems 100 are configured to selectively furnish power to the one or more connectors 304. For example, the controller 130 (or controllers 130) may be configured to provide information to the smart power systems 100 (e.g., the processor 124 of the system 110) that one or more connectors 304 are not in use. The smart power systems 100 may utilize this information to prevent distribution of power to these connectors 304. For instance, the smart power system module 128 of the smart power systems 100 may cause the processor 124 to prevent a switch element (e.g., switch element 114, switch element 116) corresponding to the unused connector 304 from transitioning to the closed configuration.

Example Smart Power System Processes

Figure 4:
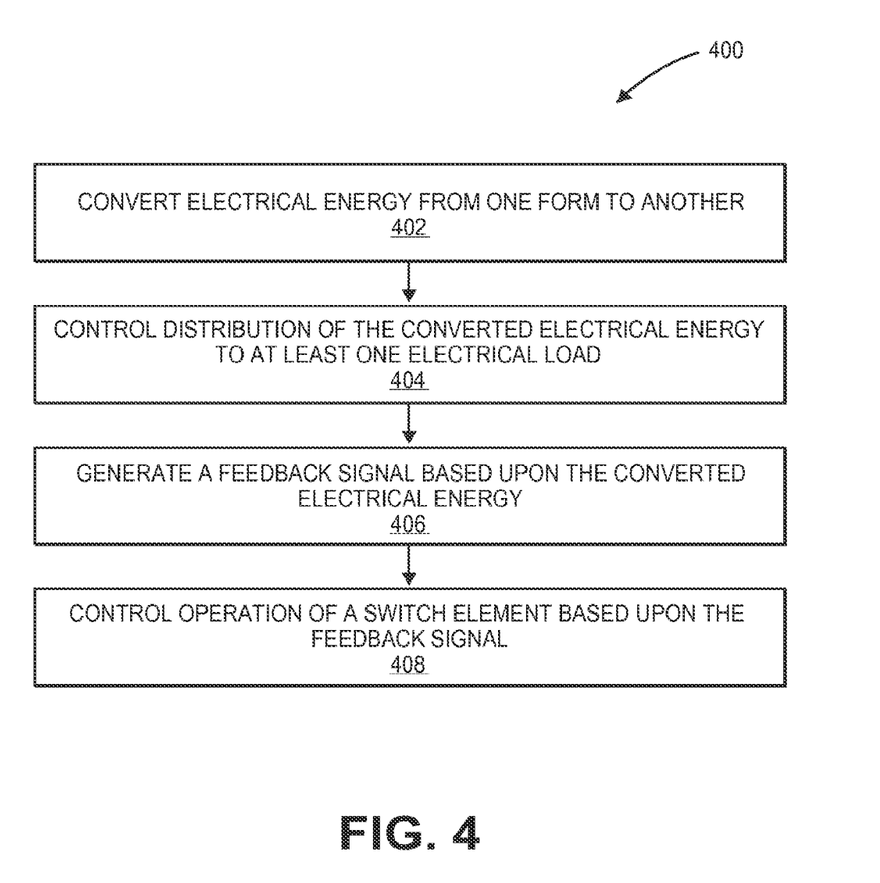
FIG. 4 is a flow diagram illustrating an example method for controlling a smart power system in accordance with an example implementation of the present disclosure.

FIG. 4 illustrates an example process (method) 400 for operating a smart power system 100 in accordance with an example implementation of the present disclosure. In the method 400 illustrated, electrical energy is converted from one form to another (Block 402). For example, the power converter 106 is configured to receive a first form of electrical energy and convert the first type of electrical energy to a second form of electrical energy (e.g., modifying a voltage amplitude characteristic, modifying a voltage frequency characteristic, converting from an AC voltage signal to a DC voltage signal, converting a DC voltage signal to an AC voltage signal). As shown in FIG. 4, distribution of the converted electrical energy is controlled by a switch element (Block 404). In one or more implementations, the switch elements 114, 116 are configured to control distribution of the converted electrical energy to the electrical load 102. As described above, the microcontroller 122 is configured to control operation of the switch elements 114, 116, which causes the switch elements 114, 116 to control distribution of the converted electrical energy. For example, the microcontroller 122 is configured to cause a switch element 114, 116 to transition from a closed configuration to an open configuration to at least substantially prevent distribution of the converted electrical energy to the electrical loads 102. In another example, the microcontroller is configured to cause a switch element 114, 116 to transition from the open configuration to the closed configuration to allow distribution of the converted electrical energy to the electrical loads 102.

A feedback signal is generated based upon the converted energy at a sense element (Block 406). As described above, the sense elements 118, 120 are electrically connected to the microcontroller 122. In one or more implementations, the sense elements 118, 120 furnish a feedback signal to the microcontroller 122, which may represent current flow delivered to an electrical load 102. As shown in FIG. 4, operation of the switch element is controlled based upon the feedback signal at a microcontroller (Block 408). As described above, the switch elements 118, 120 are configured to transition between a closed configuration for allowing distribution of the converted electrical energy to the at least one electrical load and an open configuration for at least substantially preventing distribution of the converted electrical energy to a corresponding electrical load 104A, 104B. For example, the microcontroller 122 is configured to issue microcontroller control signals for causing the switch elements 114, 116 to transition between the closed configuration to allow distribution of the converted electrical energy and the open configuration to prevent distribution of the converted electrical energy.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A smart power system comprising:
   a microcontroller;
   a switch element electrically connected to the microcontroller, the switch element configured to control distribution of electrical energy to at least one electrical load;
   a sense element electrically connected to the at least one electrical load and to the microcontroller, the sense element configured to monitor the electrical energy distributed to the at least one electrical load, the sense element configured to furnish a feedback signal based upon the electrical energy; and
   a controller configured to be integrated a backplane, the controller electrically connected to the at least one electrical load and to the microcontroller, the controller configured to bi-directionally communicate with the microcontroller and at least partially control an operation of the microcontroller, the controller and the microcontroller each including a security parameter, the controller and the microcontroller configured to prevent the operation of a given one of the controller or the microcontroller if a given security parameter is not identified by the other of the controller or the microcontroller,
   wherein the microcontroller is configured to control and to monitor distribution of the electrical energy to the at least one electrical load based upon the feedback signal.

2. The smart power system as recited in claim 1, wherein the at least one electrical load comprises an intelligent electrical load that comprises a processor.

3. The smart power system as recited in claim 1, further comprising a controller electrically connected to the at least one electrical load and to the microcontroller, the controller configured to receive diagnostic information from the at least one electrical load and to bi-directionally communicate with the microcontroller, the controller configured to furnish the diagnostic information to the microcontroller.

4. The smart power system as recited in claim 3, wherein the controller comprises a slave device and the microcontroller comprises a master device.

5. The smart power system as recited in claim 1, wherein the switch element comprises an H bridge device configured to modify the electrical energy, the H bridge including at least one common field-effect transistor (FET) pair.

6. The smart power system as recited in claim 1, wherein the sense element is configured to furnish a feedback signal to the microcontroller based upon the electrical energy distributed to the at least one electrical load, the microcontroller configured to control and to monitor distribution of the electrical energy to the at least one electrical load based upon the feedback signal.

7. The smart power system as recited in claim 1, wherein the at least one electrical load comprises an input/output (I/O) device.

8. The smart power system as recited in claim 1, wherein the microcontroller includes a processor and a memory, the memory configured to store tangible computer-readable medium embodying a program executable by the processor to cause the processor to control operation of the switch element based upon a first power characteristic.

9. The smart power system as recited in claim 8, wherein the microcontroller is configured to receive tangible computer-readable medium embodying an upgraded program executable by the processor to cause the processor to control operation of the switch element based upon a second power characteristic, the second power characteristic different from the first power characteristic.

10. The smart power system as recited in claim 1, wherein the at least one electrical load has a programmable electrical load parameter threshold associated therewith, the microcontroller configured to cause the switch element connected to the at least one load to transition from a closed configuration to an open configuration upon registering a feedback signal in excess of the programmable electrical load parameter threshold associated with the at least one electrical load, the at least one electrical load including a first electrical load and a second electrical load, the first electrical load having a first programmable electrical load parameter threshold associated therewith, the second electrical load having a second programmable electrical load parameter threshold associated therewith, the first programmable electrical load parameter threshold being different from the second programmable electrical load parameter threshold.

11. The smart power system as recited in claim 1, wherein the at least one electrical load comprises an input/output (I/O) device, the input/output module being part of an industrial control system.

12. The smart power system as recited in claim 1, wherein the controller is configured to furnish historical trend data relating to a given electrical load.

13. The smart power system as recited in claim 12, wherein the microcontroller is configured to use the historical trend data relating to a given electrical load to determine whether the given electrical load is failing.

14. The smart power system as recited in claim 1, wherein the controller and the microcontroller are each assigned a respective security key, the controller configured to prevent the microcontroller from operating if unable to identify the respective security key associated with the microcontroller, the microcontroller configured to prevent the controller from operating if unable to identify the respective security key associated with the controller.

15. The smart power system as recited in claim 1, wherein the smart power system is configured to be carried by a backplane, the backplane being a component within an industrial system or a telecommunication system.

16. The smart power system as recited in claim 1, wherein the controller is configured to receive diagnostic information from the at least one electrical load, the controller configured to furnish the diagnostic information to the microcontroller, the controller and the microcontroller each assigned a respective security key as the respective security parameter thereof, the controller configured to prevent the microcontroller from operating if unable to identify the respective security key associated with the microcontroller, the microcontroller configured to prevent the controller from operating if unable to identify the respective security key associated with the controller.

17. A smart power system comprising:
    a microcontroller;

a switch element electrically connected to the microcontroller, the switch element configured to control distribution of electrical energy to at least one electrical load;

a sense element electrically connected to the microcontroller and configured to be electrically connected to the at least one electrical load, the sense element configured to monitor the electrical energy distributed to the at least one electrical load, the sense element configured to furnish a feedback signal based upon the electrical energy; and a controller electrically connected to the microcontroller and configured to be electrically connected to the at least one electrical load, the controller configured to bi-directionally communicate with the microcontroller and at least partially control an operation of the microcontroller, the controller and the microcontroller each assigned a respective security key as a respective security parameter thereof, the controller configured to prevent the microcontroller from operating if unable to identify the respective security key associated with the microcontroller, the microcontroller configured to prevent the controller from operating if unable to identify the respective security key associated with the controller, wherein the microcontroller is configured to control and to monitor distribution of the electrical energy to the at least one electrical load based upon the feedback signal.

18. The smart power system as recited in claim 17, wherein the at least one electrical load has a programmable electrical load parameter threshold associated therewith, the microcontroller configured to cause the switch element connected to the at least one load to transition from a closed configuration to an open configuration upon registering a feedback signal in excess of the programmable electrical load parameter threshold associated with the at least one electrical load, the at least one electrical load including a first electrical load and a second electrical load, the first electrical load having a first programmable electrical load parameter threshold associated therewith, the second electrical load having a second programmable electrical load parameter threshold associated therewith, the first programmable electrical load parameter threshold being different from the second programmable electrical load parameter threshold.

19. The smart power system as recited in claim 17, wherein the controller and the microcontroller are each assigned a respective security key, the controller configured to prevent the microcontroller from operating if unable to identify the respective security key associated with the microcontroller, the microcontroller configured to prevent the controller from operating if unable to identify the respective security key associated with the controller.

20. The smart power system as recited in claim 17, wherein the controller is configured to receive diagnostic information from the at least one electrical load, the controller configured to furnish the diagnostic information to the microcontroller, the controller and the microcontroller each assigned a respective security key as the respective security parameter thereof, the controller configured to prevent the microcontroller from operating if unable to identify the respective security key associated with the microcontroller, the microcontroller configured to prevent the controller from operating if unable to identify the respective security key associated with the controller.

* * * * *